(12) United States Patent
Meli

(10) Patent No.: US 6,588,800 B1
(45) Date of Patent: Jul. 8, 2003

(54) CONNECTION FOR A WATER METER

(76) Inventor: Oswald Peter John Meli, Oak Cottage, Danzey Green, Tanworth-in-Arden, Warwickshire B94 5BJ (GB)

( * ) Notice: Subject to any disclaimer, the term of this patent is extended or adjusted under 35 U.S.C. 154(b) by 0 days.

(21) Appl. No.: 10/048,781

(22) PCT Filed: Jul. 31, 2000

(86) PCT No.: PCT/GB00/02948

§ 371 (c)(1),
(2), (4) Date: Mar. 5, 2002

(87) PCT Pub. No.: WO01/09441

PCT Pub. Date: Feb. 8, 2001

(30) Foreign Application Priority Data

Aug. 3, 1999 (GB) .............................. 9918247

(51) Int. Cl.⁷ ........................... F16L 35/00; G01F 15/14
(52) U.S. Cl. ............................. 285/30; 73/201; 73/273; 285/190; 285/133.11; 285/119
(58) Field of Search .......................... 285/30, 272, 190, 285/123.1, 121.3, 121.6, 133.11, 133.4, 119; 73/861.64, 861.89, 861.93, 273, 201, 195

(56) References Cited

U.S. PATENT DOCUMENTS

| | | | | | |
|---|---|---|---|---|---|
| 587,125 | A | * | 7/1897 | Kennedy | 285/133.11 |
| 803,919 | A | * | 11/1905 | Merrill | 73/201 |
| 825,707 | A | * | 7/1906 | Eastey | 73/201 |
| 910,514 | A | * | 1/1909 | Dilts | 137/625.29 |
| 953,505 | A | * | 3/1910 | Bassett | 285/30 |
| 1,674,561 | A | * | 6/1928 | Mueller | 137/603 |
| 2,863,317 | A | * | 12/1958 | Rings | 73/201 |
| 2,881,012 | A | * | 4/1959 | Rings | 285/30 |
| 3,542,403 | A | * | 11/1970 | Douglas | 285/30 |
| 4,691,727 | A | * | 9/1987 | Zorb et al. | 137/15.03 |
| 6,386,029 | B1 | * | 5/2002 | Katzman et al. | 73/201 |

FOREIGN PATENT DOCUMENTS

| | | |
|---|---|---|
| DE | 37 18 814 A | 12/1988 |
| DE | 91 04 036 U | 6/1991 |
| DE | 298 03 390 U | 5/1998 |
| GB | 2 292 778 B | 3/1996 |

* cited by examiner

*Primary Examiner*—Eric K. Nicholson
(74) *Attorney, Agent, or Firm*—Davis & Bujold, P.L.L.C.

(57) ABSTRACT

A pipe loop (10) for fitting a water meter (12) to a plumbing installation includes a pipe coupling having an adapter (20) with an inlet (22) and an outlet (24) and being adapted to be connected in a straight length of pipe (14) in the plumbing installation, the adapter (20) defines a seat formation (26) between the inlet (22) and outlet (24), the seat formation (26) having an axis perpendicular to the axis of the inlet (22) and outlet (24). A body portion (32) is screw threadedly connected to the adapter (20), the body portion defining a pair of coaxially radially separated tubular members (36, 42), the inner tubular member (42) extending beyond the outer tubular member (36) into sealing engagement with the seat formulation (26). The outer tubular member (36) has radial apertures (48) and an outer water jacket (50) is mounted around the outer tubular member (36), so that it is rotatable with respect thereto, the water jacket (50) being sealed between the body member (32) and the adapter. The water meter (12) is connected at one side to the inner tubular member (42) and at the other side to the water jacket (50), to complete the loop (10).

10 Claims, 1 Drawing Sheet

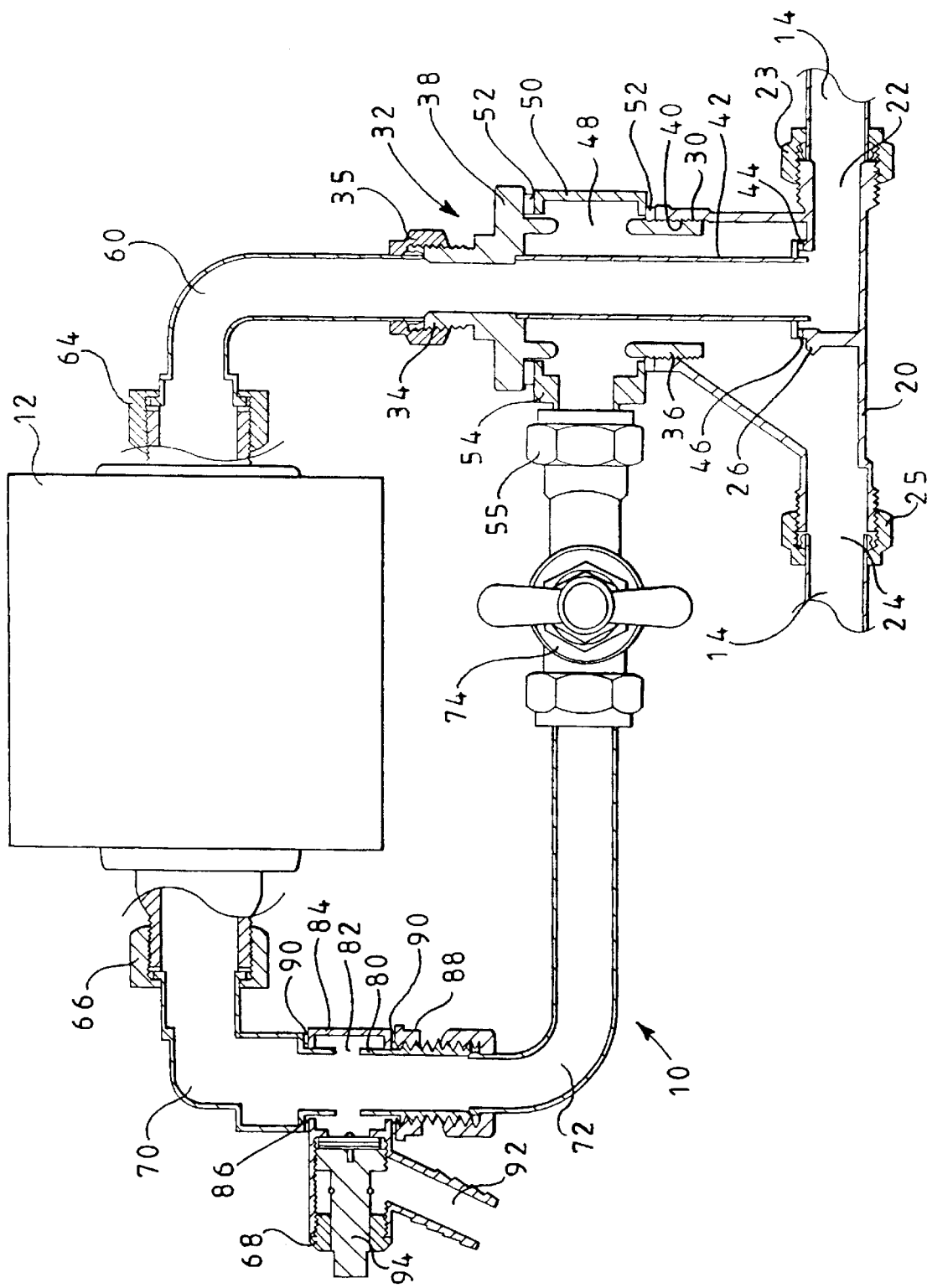

CONNECTION FOR A WATER METER

FIELD OF THE INVENTION

The present invention relates to plumbing installations and in particular to pipework for the installation of a component into an existing installation.

BACKGROUND OF THE INVENTION

When installing components, for example a water meter, into an existing plumbing installation, the existing pipework must be cut and the meter, together with isolation valves on other components jointed into the installation. As the pipes of the installation will normally be located close to a wall, this will normally require bends to be fitted in order to provide the required clearance for the meter. Furthermore, there is normally limited space in which to fit the meter, further complicating the pipework required. As a consequence the fitting of meters and like components, for example pumps or water heaters, can be a time consuming and expensive operation.

SUMMARY OF THE INVENTION

In accordance with one aspect, the present invention provides a pipe loop for fitting components to a plumbing installation, characterised in that the pipe loop comprises a pipe coupling having an adapter with an inlet and outlet located coaxially of one another and being adapted to be located in a straight length of pipe in the plumbing installation, the adapter defining a seat formation between the inlet and outlet, the seat formation having an axis perpendicular to the axis of the inlet and outlet, the adapter having a screw threaded bore coaxially of the seat formation, a body portion of the connector engaging the screw threaded bore of the adapter, the body portion defining a pair of coaxial radially separated tubular members, an inner tubular member extending beyond the outer tubular member into sealing engagement with the seat formation, the outer tubular member having radial apertures and an outer water jacket being mounted around the outer tubular member so that it is rotatable with respect thereto, the water jacket being sealed between the body member and adapter, and a component being connected at one side to the inner tubular member and at the other side to the water jacket, to complete the loop.

The pipe loop in accordance with the present invention will provide a diversion to the flow in the plumbing installation from the inlet of the adapter, through the seat and inner tubular member to the component and then back through the water jacket, radial apertures in the outer tubular member and between the inner and outer tubular members, to the outlet from the adapter. This direction of flow may of course be reversed, so that the inlet becomes the outlet and the outlet becomes the inlet.

The coaxial inlet and outlet of the adapter permits the adapter to be mounted relative to the plumbing installation at any angle through 360°. Furthermore, the coaxial mounting of the inner tubular member and water jacket, permit mounting of the loop at any angle through 360° perpendicular to the axis of the plumbing installation. The loop according to the present application may consequently be easily adapted to accommodate the restraints on the space in which it is fitted.

According to a preferred embodiment of the invention, the connections for the adapter to the plumbing installation and for the coupling to the loop are screw threaded fittings, so that appropriate adjustments may be made and then the fitting tightened to make a seal. Permanent solder joints may however be used although in such cases, final adjustment would have to be completed before the joints are made.

A further advantage of the present invention, particularly where compression joints are used, is that the components of the loop may be preassembled, final adjustment of the position of the loop and components thereof, being made during installation of the loop into the plumbing installation.

A loop in accordance with the present invention is particularly suitable for the fitting of water meters in water supplies of domestic or commercial properties. However the loop may be used to fit other components, for example pumps or heaters in existing installations. Other components, for example isolation valves and drain taps may also be included in the loop. Preferably the components in the loop are also adjustable to accommodate the varying orientation of the loop.

BRIEF DESCRIPTION OF THE DRAWING

An embodiment of the invention is now described, by way of example only, with reference to the accompanying drawing which illustrates, in partial cross-section, a pipe loop in accordance with the present invention.

DETAILED DESCRIPTION OF THE INVENTION

As illustrated in the accompanying drawing, an installation for mounting a water meter 12 into the main water supply of a domestic or commercial property, at the point of entry, comprises a loop 10 which is fitted into a straight length of pipe 14, as it enters the property.

The loop comprises a pipe coupling with an adapter 20 having an inlet 22 and an outlet 24 formed with compression fittings 23 and 25 respectively, the inlet 22 and outlet 24 being coaxial of one another.

A seat formation 26 is formed between the inlet 22 and outlet 24, the axis of the seat formation 26 being perpendicular to the axis between the inlet 22 and outlet 24. A bore 28 is formed in the adapter 20 coaxially of the seat formation 26. The outer end of the bore 28 has an internal screw thread formation 30.

A connector body 32 is a cylindrical configuration having a smaller diameter tubular portion 34 adjacent one end and a larger diameter tubular portion 36 adjacent the other end. A hexagonal flange formation 38 is provided at the junction between the tubular portions 34 and 36. A screw thread formation 40 is provided at the free end of portion 36, for engagement of the thread formation 30 on the bore 28 of adapter 20.

The internal diameter of the large tubular portion 36 is greater than the internal diameter of the smaller tubular portion 34. A length of pipe 42 is brazed into the bore of tubular portion 34, so that it extends coaxially of and spaced from the internal diameter of tubular portion 36, beyond the end of tubular portion 36. The end of the pipe 42 is provided with a flange 44 and elastomeric sealing ring 46 which, when the connector body 32 is screwed onto the adapter 20 by interengagement of threads 30 and 40, will sealingly engage the seat formation 26, thereby forming a flow path between the inlet 22 and smaller diameter portion 34 of the connector body 32 and closing connection between the inlet 22 and outlet 24.

A series of radial apertures 48 are provided in the larger diameter portion 36 of connector body 32, intermediate of the flange formation 38 and screw threaded formation 40. An annular water jacket 50 is mounted around the larger diameter tubular portion 36, the ends of the water jacket 50 being sealed by means of sealing washers 52 located between the water jacket 50 and flange formation 38 and between the water jacket 50 and adapter 20.

An outlet stub 54 extends radially from the water jacket 50. The free end of the smaller diameter portion 34 is also provided with a compression fitting 35.

The smaller diameter tubular portion 34 of connector body 32 is connected via a right angled bend 60 to the inlet 64 of the water meter 12. The outlet 66 from the water meter 12 is connected to a drain tap 68, via a right-angled bend 70. The drain tap 68 is connected by a right-angled bend 72 to isolation valve 74 by means of a compression fitting 75. The isolation valve 74 is then connected to the outlet stub 52 of water jacket 50 by compression fitting 55, to complete the loop 10.

On completion of the loop 10, water will flow from pipe 14 through inlet 22, passed the seat formation 26, through the pipe 42 and portion 34 of the connector body 32, to the meter 12. Water is then returned from the meter 12, via drain tap 68, isolation valve 72, the water jacket 50, apertures 48 and between the inner diameter of portion 36 of connector body 32 and the pipe 42, to the outlet 24 and pipe 14. The whole of the flow through pipe 14 is thereby diverted through the water meter 12.

When fitting the loop, the pipe 14 is cut on a straight length thereof at an appropriate position and the adapter 20 is located between the cut ends of pipe 14 by compression joints 23,25. The adapter 20 may then be rotated relative to the pipe 14, to adjust the position of the bore 28, so the loop 10 will extend from the pipe 14 in an appropriate direction, before the compression joints 23,25 are tightened to provide a seal between the pipe 14 and the adapter 20.

The loop 10 may then be preassembled onto the connector body 32, although the connections thereof will not be tightened fully until the loop 10 is installed and the positions of the components finally adjusted. The connector body 32 is then screwed into the adapter 20, the loop 10 being rotated about the axis of connector body 32 by rotation of the joint between portion 34 and bend 60 and between the water jacket 50 and portion 36; to further adjust the orientation of the loop 10 to meet spacial restraints.

The body portion 32 may then be fully tightened to clamp the water jacket 50 and seal it between the flange formation 38 and adapter 20 and to bring the tube 42 into sealing engagement with the seat formation 36.

The orientation of the meter 12, drain tap 68 and isolation valve 74 may then be finally adjusted, before the joints of these components are tightened.

In the embodiment illustrated above, the drain tap 68 comprises an inner tubular member 80 with apertures 82 therein and a water jacket 84 rotatably mounted on the inner tubular member 80, the water jacket 84 being sealed between a flange formation 86 and a clamping nut 88 by sealing washers 90. An outlet 92 and valve means 94 are provided on the water jacket 84. In this manner, the orientation of the drain tap 68 may be adjusted through 360° and furthermore, the direction of the outlet 92 may be adjusted, by reversing the water jacket 84.

The outlet stub 52 on water jacket 50 may furthermore be offset axially. By this means, the water jacket 50 may be reversed to adjust the axial location of the stub 52 in order to accommodate tolerance variations in the build of loop 10.

As described above, the adapter 20 is installed in the pipe 14 before the connector body 32 is screwed into the adapter 20. It will however be appreciated that if space allows, the connector body 32 may be screwed into the adapter 20, although not tightened with respect thereto, before fastening the adapter 20 to the pipe 14.

Various modifications may be made without departing from the invention. For example, while in the above embodiment, a separate pipe 42 is brazed to the smaller diameter portion 34 of connector body 32, alternatively, the connector body 32 may be formed as a single piece, including a pipe formation corresponding to the pipe 42.

In addition to the isolation valve 74 and drain tap 68, other components may be included in the loop. Furthermore, isolation valves and/or drain taps of other designs or a combined isolation valve/drain tap may be used. The additional components fitted in the loop may be adapted in themselves for adjustable orientation and/or may be fitted by means of compression joints which will permit adjustment of their orientation about the axis thereof.

What is claimed is:

1. A pipe loop (10) for fitting components (12) to a plumbing installation, wherein the pipe loop (10) comprises a pipe coupling (20, 32) having an adapter (20) with an inlet (22) and outlet (24) located coaxially of one another and being adapted to be located in a straight length of pipe (14) in the plumbing installation, the adapter (20) defining a seat formation (26) between the inlet (22) and outlet (24), the seat formation (26) having an axis perpendicular to the axis of the inlet (22) and outlet (24), the adapter (20) having a screw threaded bore (40) coaxially of the seat formation (26), a body portion (32) of the coupling engaging the screw threaded bore (40) of the adapter (20), the body portion (32) defining a pair of coaxial radially separated tubular members (36, 42), an inner tubular member (42) extending beyond the outer tubular member (36) into sealing engagement with the seat formation (26), the outer tubular member (36) having radial apertures (48) and an outer water jacket (50) being mounted around the outer tubular member (36) so that it is rotatable with respect thereto, the water jacket (50) being sealed between the body member (32) and adapter (20), and a component (12) being connected at one side to the inner tubular member (42) and at the other side to the water jacket (50), to complete the loop (10).

2. The pipe loop (10) according to claim 1, wherein the inlet (22) and outlet (24) to the adapter (20) are provided with compression fittings (23, 25) for connection to the straight length of pipe (14) of the plumbing installation.

3. The pipe loop (10) according to claim 1, wherein the body portion (32) of the connector is formed of cylindrical configuration having a smaller diameter tubular portion (34) adjacent one end and a larger diameter tubular portion (36) adjacent the other end, a tube (42) being secured to the internal diameter of the smaller diameter portion (34) so that it extends coaxially of and beyond the larger diameter portion (36) and is spaced radially therefrom.

4. The pipe loop (10) according to claim 1, wherein a sealing ring (46) is provided on the end of the inner tubular member (42), for sealing engagement of the seat (26).

5. The pipe loop (10) according to claim 1, wherein said component (12) is a water meter, a pump or a water heater.

6. The pipe loop (10) according to claim 1, wherein other components (68, 74) are included in the loop (10).

7. The pipe loop (10) according to claim 1, wherein an isolation valve (74) is included in the loop (10).

8. The pipe loop (10) according to claim 1, wherein a drain tap (64) is provided in the loop (10).

9. The pipe loop (10) according to claim 8, wherein the drain tap (64) comprises an inner tubular member (80)

extending between an inlet and an outlet, the inner tubular member (80) having radial apertures (82) therein, a water jacket (84) being rotatably mounted on the inner tubular member (80), the water jacket (84) being sealed between a flange formation (86) on the inner tubular member (80) and a clamping nut (88) engaging a screw thread formation on the inner tubular member (80), the water jacket (84) being provided with an outlet (92) and valve means (94) to control flow of water to the outlet (92).

10. The pipe loop (10) according to claim 1, wherein the component or components (12, 68, 74) are connected in the loop (10) by means of screw threaded joints (64, 66), whereby the orientation of the components (12, 68, 74) may be adjusted before the joints (64, 66) are tightened to complete the joint.

* * * * *